United States Patent [19]

Weldon et al.

[11] 4,246,507
[45] Jan. 20, 1981

[54] REMOVABLE BRUSH MECHANISM FOR A HOMOPOLAR GENERATOR

[75] Inventors: William F. Weldon; James M. Weldon, both of Austin, Tex.

[73] Assignee: Astec Industries, Inc., Chattanooga, Tenn.

[21] Appl. No.: 946,667

[22] Filed: Sep. 28, 1978

[51] Int. Cl.² ........................................... H02K 39/38
[52] U.S. Cl. ..................................... 310/242; 310/42; 310/178; 310/229
[58] Field of Search ............... 310/178, 219, 102, 142, 310/42, 239, 228, 230, 238, 240, 90, 241, 243, 245, 171, 248–251; 322/48; 318/253, 541, 542

[56] References Cited

U.S. PATENT DOCUMENTS

| | | | |
|---|---|---|---|
| 1,164,261 | 12/1915 | Creveling | 310/230 |
| 1,448,377 | 3/1923 | Bethel | 310/243 |
| 1,719,407 | 7/1929 | Trudeau | 310/239 |
| 1,805,935 | 5/1931 | Weathers | 310/237 |
| 2,134,511 | 10/1938 | Hague | 310/178 |
| 2,230,131 | 1/1941 | Chandeysson | 310/178 |
| 2,703,372 | 3/1955 | Savage | 310/228 |
| 3,944,865 | 3/1976 | Jewitt | 310/178 |
| 4,082,975 | 4/1978 | Azarov | 310/239 |
| 4,110,648 | 8/1978 | Stillwagon | 310/178 |
| 4,114,061 | 9/1978 | Hayes | 310/241 |

Primary Examiner—R. Skudy
Attorney, Agent, or Firm—Jones, Thomas & Askew

[57] ABSTRACT

The improved homopolar generator includes a unit carrying the brushes which may be easily removed from the yoke structure. The unit includes brushes, a portion of the return conductor and a movable segment of the yoke, and rides along tracks extending from within the yoke cavity to a position outside of the yoke cavity. The yoke segment included in the unit fits into a mating opening in the yoke, and the magnetic field created by the field coil holds the movable yoke segment in position against the yoke.

6 Claims, 6 Drawing Figures

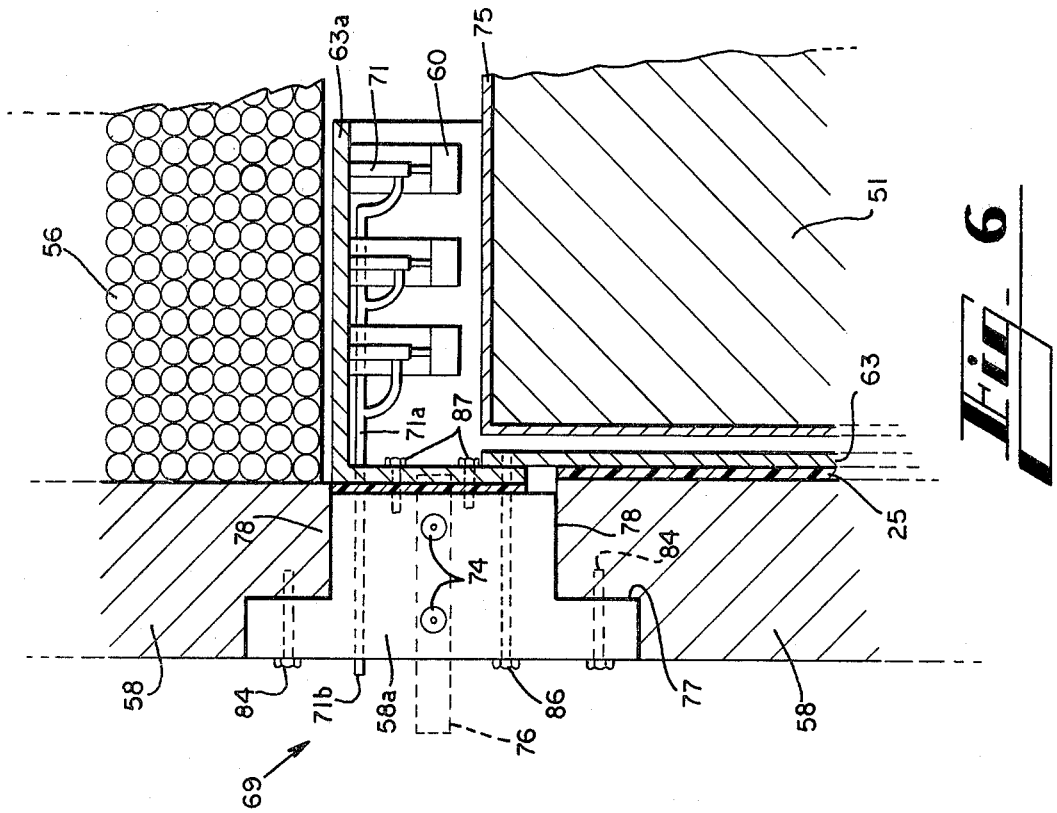
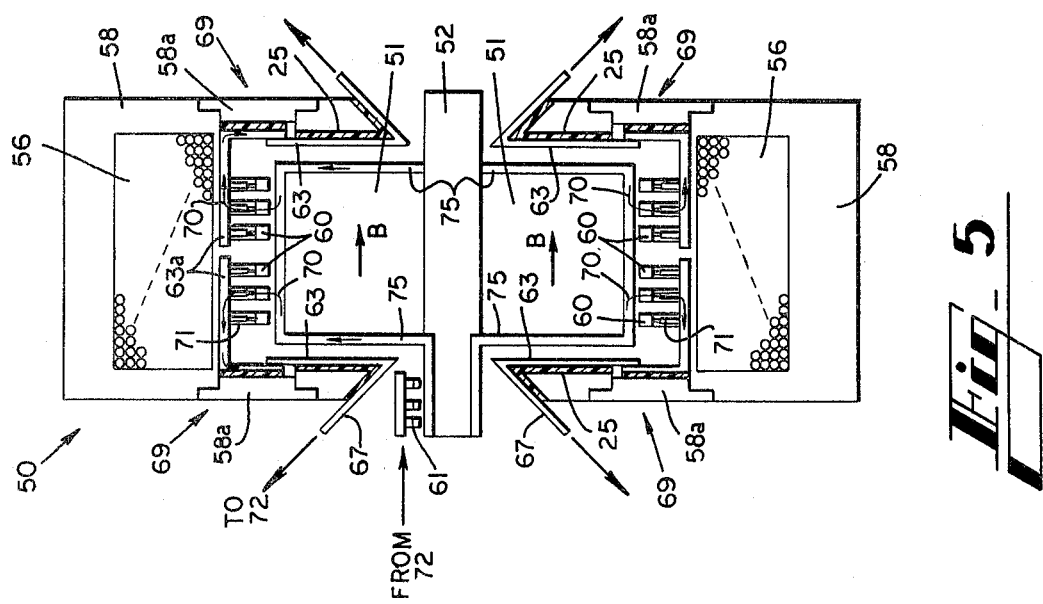

REMOVABLE BRUSH MECHANISM FOR A HOMOPOLAR GENERATOR

BACKGROUND OF THE INVENTION

The present invention relates relates to current production by homopolar generators, and more particularly to pulsatile, high current generation by the conversion of inertial energy stored in the rotor of a homopolar generator to electric current, and the discharge of the electric current from the generator to an external circuit or workpiece.

Homopolar generators have been successfully designed for providing pulsed discharges lasting a few seconds and producing a peak current level in excess of a million amperes direct current. Such generators generally include a cylindrical rotor of either a drum or disc configuration, mounted on a frame, to be rotated about an axis through the center of the cylinder. A field coil encircling the rotor and connected to an external current supply provides an applied field excitation passing through the rotor. The applied field excitation is usually confined and directed by a ferromagnetic yoke surrounding the field coil and all, or a portion of, the rotor. When the rotor is spinning, the free electrons within the rotor experience an electromotive force resulting from their interaction with the applied field excitation. Brushes, positioned inside the field coil or between two halves of the field coil, are then lowered onto the spinning rotor to allow a current to flow under the influence of such electromotive force through return conductors to an external circuit, and then back into the rotor through additional brushes at a different location. During the discharge, the interaction of the discharge current and the applied field excitation creates a force which decelerates the rotor until its rotation stops and the discharge therefore ends. It has been found, as mentioned above, that extremely high current pulses may be obtained after using a relatively low power conventional prime mover or a conventional low voltage, low amperage power source to store inertial energy in the rotor by gradually motoring the rotor up to the desired rotational speed.

The general state of the art relating to pulse power homopolar generators is shown in the following publications which are incorporated herein by reference: H. H. Woodson, H. G. Rylander, W. F. Weldon, M. D. Driga, E. B. Becker, K. M. Tolk, R. C. Swanson, C. Ramage, J. M. Weldon, M. Hart, "Homopolar Motor-Generator for Inexpensive Inertial Energy Storage," *Texas Atomic Energy Research Foundation Report*, Progress Report No. 22, Nov. 1, 1974; W. F. Weldon, M. D. Driga, H. H. Woodson, H. G. Rylander, "The Design, Fabrication, and Testing of a Five Megajoule Homopolar Motor-Generator," *International Conference on Energy Storage, Compression, and Switching*, Torino, Italy, Nov. 5-7, 1974 (Reprint, University of Texas Departments of Mechanical and Electrical Engineering); R. C. Swanson, Editor, "Progress Report No. 1, Homopolar Motor-Generator Research for Inertial Energy Storage," University of Texas, Energy Storage Group report to the Energy Research and Development Administration, June, 1975.

In order to effectively conduct a current from or to the spinning rotor, the stationary brushes of the homopolar must be made of a relatively soft conductive material such as graphite or copper-graphite. The brushes are biased against the rotor surface during discharge, and are subject to constant wear. Therefore the brushes must be periodically replaced, and access to the brushes is necessary. Access may also be required for maintenance of the brush retractor mechanism and electrical connections to the brushes.

In order to avoid dismantling the massive yoke to reach the brushes, prior art homopolar generators have included ports through the rotor or removable ferromagnetic plugs extending through the rotor. Service lines such as compressed air lines for operating the brush retractor mechanism have passed through the ports or have been carried by the plugs. Such openings have passed either axially through the yoke below the field coil, or radially through the yoke if the field coil was split into two halves on either side of the brushes. Such openings not fitted with ferromatnetic plugs have been made as small as possible to minimize disruption of the magnetic field confined and directed by the yoke. Thus, access to the brushes and associated apparatus has been obtained only by reaching far into the generator structure with an arm or tool that tended to obstruct vision of the work being performed, and to make such work awkward and difficult. Furthermore, if the field coil is split to allow such access the two halves of the field coil exert a significant force on one another, so that the apparatus must be built with greater structural strength.

Similar brush access has been provided in electric motor generators such as that disclosed in U.S. Pat. No. 1,805,935, issued to Weathers.

SUMMARY OF THE INVENTION

The present invention provides, in a homopolar generator including a ferromagnetic yoke defining a cavity having a field coil therein encircling a rotor, and a plurality of brushes selectively biased against said rotor, an improvement comprising a means for receiving the brushes to allow selective movement of the brushes into and out of the cavity defined by the yoke. By allowing the brushes to be easily removed as a unit, the invention facilitates maintenance and replacement of the brushes, since work thereon may be done outside of the yoke cavity.

The present invention may be embodied by a removable brush unit including brushes, a portion of a return conductor of the homopolar generator, and a movable segment of the yoke, the brush unit sliding on guides which extend from the exterior of the yoke into the yoke cavity to guide the brush unit into position with respect to the rotor. The movable yoke segment may fit into a mating opening defined by the yoke such that the magnetic field confined and directed by the yoke will tend to hold the movable yoke segment, and therefore the brush unit, in position during operation of the homopolar generator.

In homopolar generators of the drum type, the brush unit may inlude both inner and outer brushes.

Thus, it is an object of the present invention to facilitate access to brushes in a homopolar generator.

It is a further object of the invention to provide brushes which may be slidably removed from the yoke cavity of a homopolar generator.

It is another object of the invention to provide a removable brush unit for a homopolar generator to allow easy replacement of brushes and to allow maintenance on brushes to be carried out remote from the interior of the generator structure.

It is another object of the invention to provide a removable brush unit for a homopolar generator, the unit including a movable segment of the yoke that is held in position by electromagnetic forces when the field coil is energized.

Other objects, features and advantages of the present invention will become apparent upon reading the following specification when taken in conjunction with the accompanying drawing.

BRIEF DESCRIPTION OF THE DRAWING

FIG. 5 is a diagrammatic cross-sectional representation of a disc-type homopolar generator.

FIG. 6 is a detailed view of the roll-out brush unit of the disc-type homopolar generator of FIG. 5.

DESCRIPTION OF THE PREFERRED EMBODIMENTS

Figure 1:
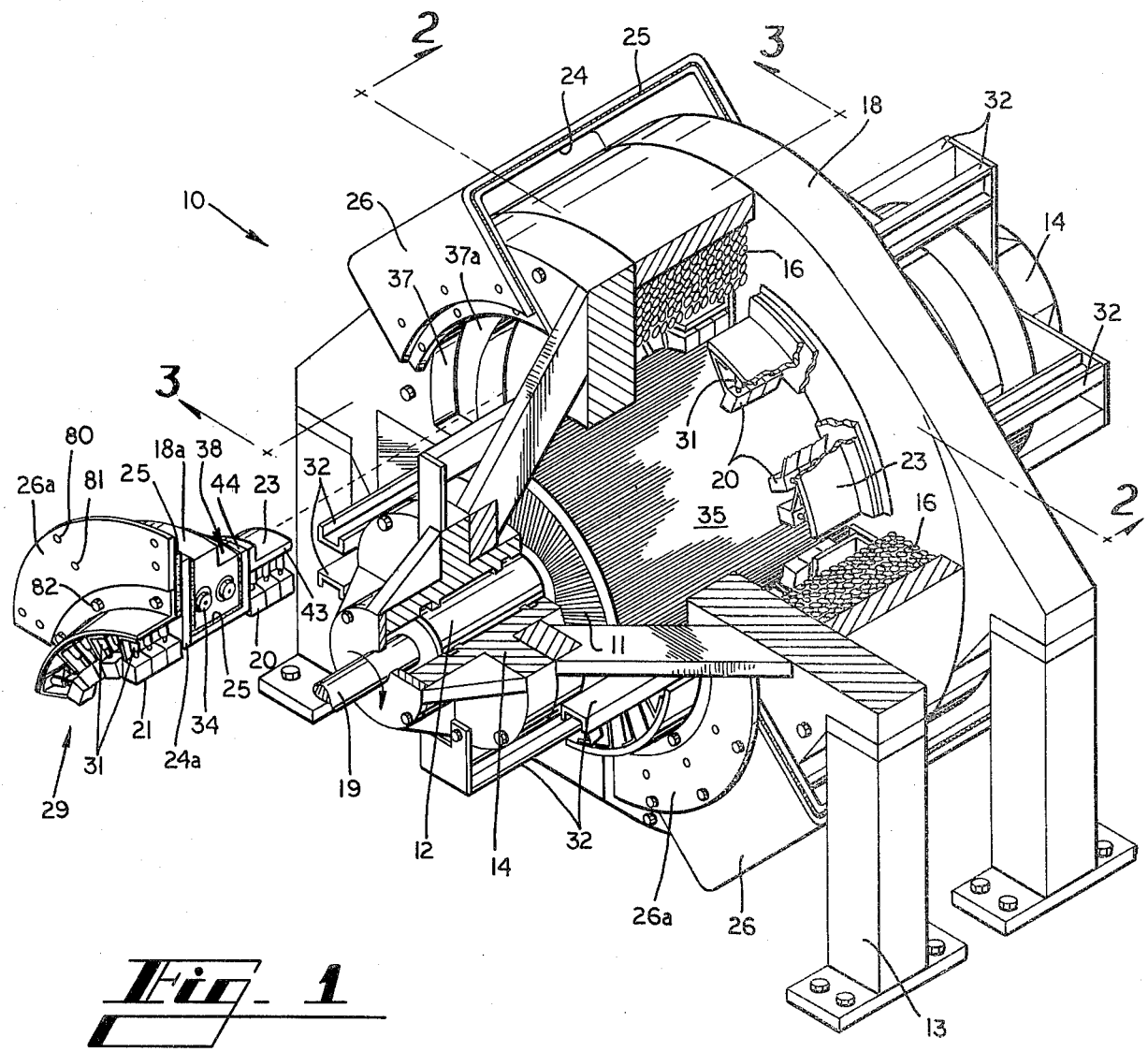
FIG. 1 is a pictorial view of a drum-type homopolar generator including a brush mechanism according to the present invention shown in an exploded view.
Figure 3:
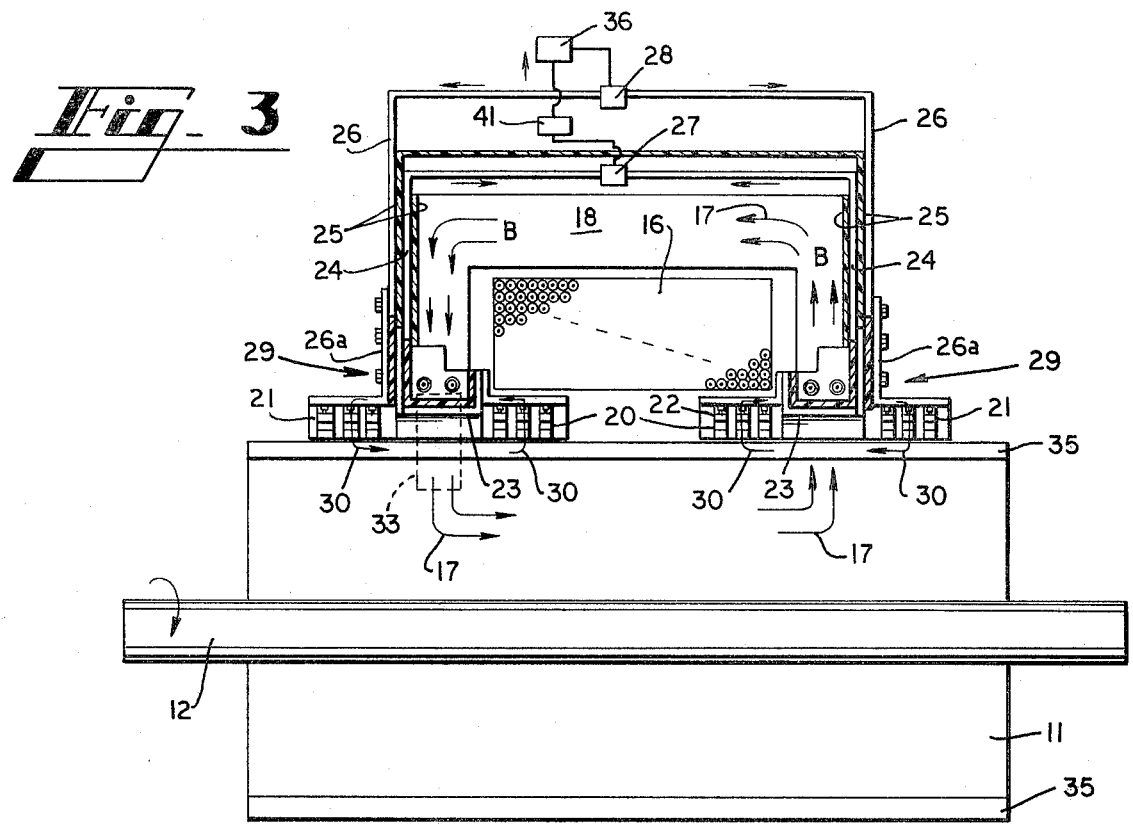
FIG. 3 is a diagrammatic partial longitudinal cross-sectional view of the homopolar generator of FIG. 1, taken along line 3—3 of FIG. 1.

Referring now in more detail to the drawing, in which like numerals indicate like parts throughout the several views, FIG. 1 shows a drum-type homopolar generator 10 which includes a cylindrical rotor 11 of ferromagnetic material firmly attached to a rotor shaft 12 which is preferably, although not necessarily, constructed of non-ferromagnetic material. FIG. 3 shows a diagrammatic vertical cross-section of the generator of FIG. 1, showing the structure surrounding the rotor on only one side of the rotor. the structure on the opposite side of the cross-section in FIG. 3 is identical to that shown. The rotor shaft 12 is carried in high stiffness hydrostatic bearings 14 mounted on a frame 13. A field coil 16 encircles the center of the rotor 11. The turns of the field coil 16 comprise copper tubing which is potted in epoxy and fiberglass to withstand the electromagnetic forces exerted on the turns of the coil. Connections (not shown) are provided for pumping water through the copper tubing to cool the field coil. Surrounding the field coil on three sides and defining a cavity containing the field coil is a massive ferromagnetic yoke 18 which functions to confine and direct the magnetic field B, which is shown by the arrows 17 in FIG. 3, in a direction perpendicularly into the rotor, then bending to follow the axis of the field coil, and then bending to reenter the yoke 18 perpendicularly from the rotor 11. The greater portion of the yoke is a fixed yoke segment 18. However where the fixed yoke segment 18 comes closest to the rotor, there is defined an arcuate cutout 37, including an arcuate shoulder 37a extending toward the rotor 11 adjacent to the cavity defined by the yoke, and shaped to matingly receive a movable ferromagnetic yoke segment 18a. The movable yoke segment 18a is part of a removable brush unit to be described hereinafter.

The drum-type generator 10 includes a plurality of retractable sintered copper-graphite brushes, inner brushes 20 between the field coil 16 and the rotor 11 within the sides of the yoke 18 which extend to a position near the cylindrical surface of the rotor 11, and outer brushes 21 adjacent the cylindrical surface of the rotor 11 outside the yoke 18. Each of the inner brushes 20 is attached by a copper strap 22 to one of eight return conductors 23 which run along the inside of the field coil 16 to the side of the yoke 18 and then around the yoke 18 where the yoke comes in close proximity to the surface of the rotor 11. Since the return conductors 23 lie against the yoke 18, the forces exerted on the return conductors during discharge are absorbed by the yoke. The return conductors 23 are insulated from the yoke 18 by insulating material 25. Each return conductor 23 is formed of two L-shaped, arcuate members or plates, a first member 43 carrying the brushes and a second member 44 lying against the yoke segment as described below. All of the inner and outer brushes 20 and 21 are fitted with brush retractors 31 which spring bias the brushes against the rotor 11 and lift the brushes by air pressure in a manner known to those skilled in the art.

The return conductors 23 are connected, as they emerge from the yoke 18, to heavy, highly conductive bus bars 24. The four bus bars 24 join the segements of the return conductor 23 to an output terminal 27, as shown in FIG. 3. A load or workpiece 36, such as metal pieces to be resistance welded by the discharge from the homopolar generator, is connected between the output terminal 27 and a second output terminal 28 which is connected to another set of four bus bars 26 which return alongside the yoke 18 and are connected to the outer brushes 21. The bus bars 24 and 26 run adjacent to each other to minimize impedance and are separated by insulation 25. Each bus bar 24 and 26 includes a main portion fixed to the fixed yoke segment 18 and a bus bar segment 24a and 26a, respectively, fixed to the movable yoke segment 18a. A low resistance, high current making switch 41 of the type known to those skilled in the art is included in the circuit.

Figure 2:
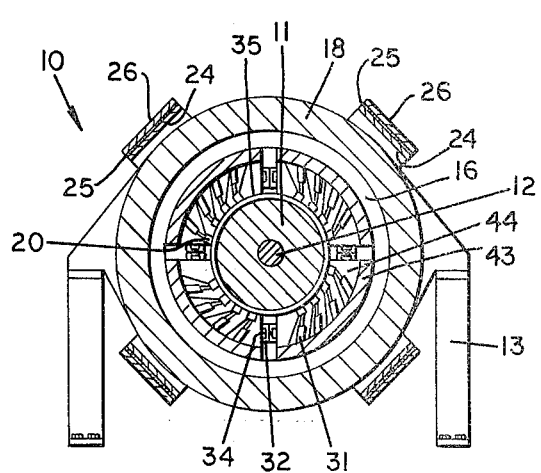
FIG. 2 is a transverse vertical cross-sectional view of the homopolar generator of FIG. 1, taken along line 2—2 of FIG. 1.

In the embodiment of the present invention shown in FIGS. 1-3, a layer 35 of highly conductive material, such as copper, is firmly attached to the cylindrical surface of the rotor 11. A layer formed of copper from ⅜" (9 millimeters) to 1" (25 millimeters) in thickness has been found to be adequate to prevent undue penetration of discharge current into the rotor in order to neutralize armature reaction, as described in our co-pending application entitled "Method and Apparatus for Controlling Armature Reaction in a Homopolar Generator."

Easy access to the brushes of the homopolar generator is provided by means of eight removable brush units 29, each including a set of inner brushes 20 carried by the first member 43 of a return conductor 23, a movable yoke segment 18a, bus bar segments 24a and 26a and the corresponding set of outer brushes 21 which are mounted on the bus bar segment 26a. The brush unit 29 may be rolled on bearings 34 along tracks 32 in a direction parallel to the axis of the rotor out from a position above the rotor 11 so that the brush unit 29 may be easily removed for servicing. The tracks 32 and brush unit 29 thereby provide a means for slidably receiving the brushes 20 to allow selective movement of the brushes 20 into and out of the cavity defined by the yoke.

In each brush unit 29, the arcuate movable yoke segment 18a carries bearings 34 on each end thereof to roll or slide along the tracks 32, and includes an arcuate cutout 38 to allow the movable yoke segment 18a to matingly fit against the shoulder 37a within the cutout 37 in the yoke 18. The L-shaped, arcuate second member 44 of the return conductor 23 fits against the inner and lower sides of the yoke segment 18a, but is separated from the yoke segment by insulation 25. The first member 43 of the return conductor is bolted to the second member 44 and to the yoke segment by bolts 83 to provide an electrical connection between the two members of the return conductor. The inner brushes 20 are suspended from the first member 43 by the brush straps 22, and are also connected to the first member 43 by brush retractors 31 which each include an extension spring to bias the brush against the rotor and an air cylinder to selectively lift the brush from the rotor, as is known to those skilled in the art. The purpose of spring biasing the brushes onto the rotor is to avoid arcing which could occur if air pressure holding the brushes onto the rotor failed, causing the brushes to lift off the rotor during a discharge. The air cylinders of the brush retractors 31 are supplied by air lines 31a which extend from the inner brushes 20 through the movable yoke segment 18a to the outer brushes 21, and terminate in connectors 31b for easy connection and disconnection to an external supply of compressed air (not shown).

Figure 4:
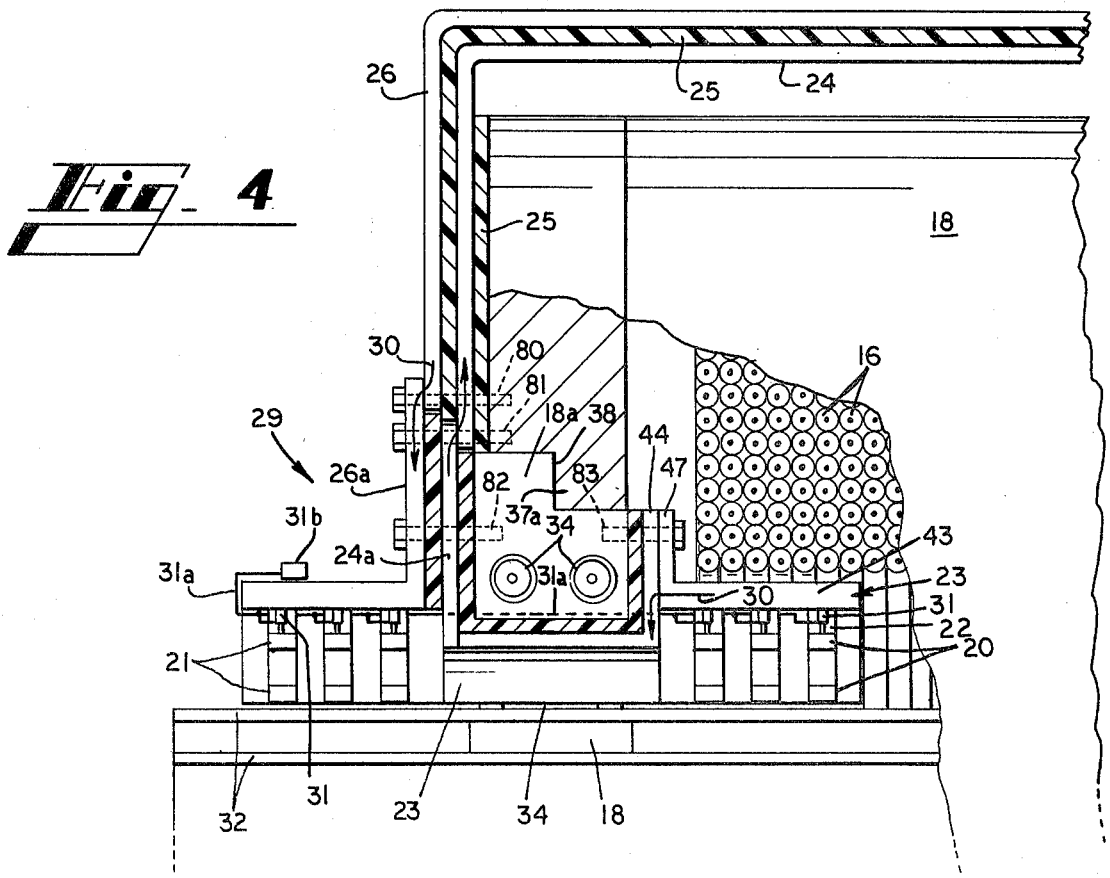
FIG. 4 is a partial side view of a homopolar generator according to the present invention with a portion of the yoke and field coil broken away to show the roll-out brush unit in place.

The bus bar segment 24a lines the outer side of the movable yoke segment 18a but is insulated therefrom. The bus bar segment 24a extends inwardly to make an electrical connection with the return conductor 23, and outwardly slightly beyond the upper surface of the movable yoke segment 18a, so that the bus bar segment 24a overlaps and makes an electrical connection with the bus bar 24 when the brush unit 29 is rolled into operating position, as shown in FIG. 4. The bus bar 24 extends inwardly along the yoke 18 slightly further than bus bar 26 to allow bus bar 24 to contact bus bar segment 24a. Similarly, the bus bar segment 26a extends outwardly slightly beyond the bus bar segment 24a so that bus bar segment 26a overlaps and contacts bus bar 26 when the brush unit 29 is rolled into operating position. The sheets of insulation 25 separating bus bar segments 24a and 26a, and separating bus bars 24 and 26 likewise overlap. Bus bar segement 26a is bolted to the yoke segment 18a and to bus bar segment 24a by bolts 82, and is insulated therefrom by insulation 25. Bus bar segment 26a extends laterally at an approximate right angle away from the yoke segment 18a, as shown in FIGS. 1 and 4, and the portion of the bus bar segment 26a thus formed provides a conductive surface for suspension of the outer brushes 21 and the associated brush retractors 31.

It will be understood that the overlapping of the bus bars and bus bar segments described above minimizes the breakable connections between the bus bars and the brushes, since each unit 29 carries many brushes.

In order to operate the homopolar generator 10 to discharge a pulse of current through the workpiece 36, the brush units 29 are first rolled into position above the rotor 11 along the tracks 32. Bolts 80 and 81 are used to secure the brush units 29 in position and to maintain a firm contact between the bus bar segments 24a and 26a and the bus bars 24 and 26, respectively. The rotor 11 is then motored to a selected rotational speed by a drive unit (not shown) having an electrically insulated drive shaft 19 connected to the rotor shaft 12. An exciting current is then driven through the field coil 16 by an external source of potential (not shown). If the rotation of the rotor and the direction of the exciting current in the field coil are clockwise as indicated in FIG. 1, a field B will be created within the yoke 18 and the rotor 11 as shown by the arrows 17 in FIG. 3. It will be understood by those skilled in the art that any outward movement of the movable yoke segment 18a will cause an alteration in the path of the field B, and an air gap where the movable yoke segment 18a separates from the shoulder 37a in the opening 37 in the fixed yoke segment 18. Because of the greatly increased energy required to drive the field B through an air gap rather than through the ferromagnetic yoke material, electromagnetic forces are created tending to hold the movable yoke segment 18a in position against the fixed yoke segment 18. In the region 33 enclosed by dashed lines in FIG. 3, the magnetic field B passes from the yoke 18 essentially perpendicularly into the rotor 11. The rotation of the rotor 11 carries free electrons within the rotor through the magnetic field B, therefore causing a force to be exerted on the electrons longitudinally along the rotor toward the center of the rotor.

If the brushes 20 and 21 are then lowered against the surface of the rotor and the switch 41 is closed, a current 30 will flow longitudinally along the rotor through the inner brushes 20, through the return conductor 23, through the bus bar segment 24a to the bus bar 24, through the output terminal 27 and the workpiece 36, through terminal 28 to the bus bar 26, through the bus bar segment 26a to the outer brushes 21, and back into the rotor 11. As the discharge current 30 occurs, the discharge current 30 interacts with the applied magnetic field B inducing a second force on the moving electrons forming the discharge current within the rotor 11 in a direction opposite to the direction of rotation of the rotor 11. This second force decelerates and finally stops the rotation of the rotor 11.

It will be noted that the magnetic field B at the opposite side of the yoke 18 is parallel but opposite in direction to the magnetic field B in region 33. Therefore the discharge current 30 under the influence of such field also flows toward the center of the rotor 11 as shown in FIG. 3, and along an identical path as described above. At the completion of a discharge pulse, the switch 41 is opened the brushes are immediately lifted, and the rotor 11 is motored to the selected rotational speed for another discharge.

After repeated discharges, the brushes 20 and 21 suffer substantial wear as the result of being biased against the rotating rotor 11. In addition, it may occasionally be necessary to repair or service the brush retractors 31 or the air lines 31a. In either case the apparatus of the present invention allowing movement of the inner brushes 20 with the inner brush retractors 31 and air lines 31a into and out of the cavity defined by the yoke 18 permits ready access to these components for easy maintenance. An entire brush unit 29 may be removed from the homopolar generator 10 and immediately replaced by a substitute brush unit so that the generator may continue in operation during the maintenance operations. Work on the outer brushes 21 as well as the inner brushes 20 is made easier by the complete removal of the brush unit. The necessity for reaching well into the generator structure to carry out maintenance and repair is eliminated.

The improvement described above may be applied equally well to a disc-type homopolar generator 50, as shown in FIG. 5. The physical configuration of the disc-type homopolar generator 50 is similar to that of a drum-type machine, with a ferromagnetic rotor 51 on a shaft 52 being surrounded by a field coil 56 and a ferromagnetic yoke 58. However, the yoke 58 extends toward the shaft 52 adjacent the flat sides of the rotor 51. The inner brushes 60 are mounted between the field coil 56 and the rotor 51 and connect to a return conductor 63 which extends along the inner surface of the yoke 58 between the yoke and the rotor 51, and terminates in output terminals 67.

During discharge of a disc homopolar machine the discharge current 70 flows radially within the rotor 51 and through the inner brushes 60. The discharge current 70 then flows through the return conductor 63 to an external circuit or workpiece 72 (not shown) as described above for the drum-type homopolar, and is returned to the rotor 51 through outer brushes 61 which are located adjacent the rotor shaft 52.

The mechanism of the present invention for removal of the brushes is provided in a disc-type homopolar generator by a plurality of brush units 69, which each include only inner rotor brushes 60 because of the remote location of the outer shaft brushes 61. Each brush unit 69 includes an arcuate movable yoke segment 58a having a T-shaped cross-section, as shown in FIG. 6, and an arcuate, L-shaped return conductor segment 63a bolted to the yoke segment 58a with a plurality of bolts 87, but is insulated therefrom. The movable yoke segment 58a moves on bearings 74 along tracks 76 (shown in dotted lines in FIG. 6) similar to the tracks 32 of the drum-type homopolar generator into a mating opening 77 in the fixed yoke segment 58. The mating opening 77 includes a pair of arcuate shoulders 78 (similar to the shoulder 37a of the drum-type generator). When the yoke segment 58a is in operating position, the cross-bar of the "T" bears against the shoulders 78 as shown in FIG. 6. The leg of the L-shaped return conductor segment 63a not bolted to the movable yoke segment 58a extends perpendicularly therefrom and carries the brushes 60 and accompanying brush retractors 71. Air lines 71a supply the brush retractors 71 and extend through the movable yoke segment 58a to a convenient exterior connector 71b. The brush unit is maintained in position during operation by bolts 84 and by electromagnetic forces which are created if the yoke segment 58a is moved laterally while a magnetic field is passing therethrough, as described above. Additional bolts 86 connect the return conductor segment 63a with the return conductor 63 which extends outwardly from the rotor to overlap the return conductor segment.

It will be understood by those skilled in the art that homopolar generators of both the drum-type and disc-type may be oriented so that the axis of the rotor 11 or 51 may be in a direction other than horizontal and still embody the present invention. It will be further understood that the movable yoke segments 18a and 58a may be formed in a variety of shapes and still fall within the concept of the present invention.

While this invention has been described in detail with particular reference to preferred embodiments thereof, it will be understood that variations and modifications can be effected within the spirit and scope of the invention as described hereinbefore and as defined in the appended claims.

What is claimed is:

1. In a homopolar generator including a ferromagnetic yoke defining a cavity having a field coil therein encircling a rotor, and a plurality of brushes selectively biased against said rotor, the improvement comprising:
   a track means extending from the exterior of said yoke cavity into said yoke cavity; and
   a removable brush unit including a conductive member carrying said brushes, a ferromagnetic member carrying said conductive member and said brushes, and a plurality of bearings positioned to engage said track means to slidably mount said unit on said track means for selective movement into and out of said yoke cavity, said ferromagnetic member being received by a mating opening defined by said yoke when said unit is moved into said yoke cavity.

2. The apparatus of claim 1, wherein said yoke defines a shoulder within said mating opening, said ferromagnetic member bearing against said shoulder when slidably inserted into said mating opening.

3. The apparatus of claim 1, further comprising a means, responsive to movement of said unit away from said cavity when current is flowing in said field coil, for creating electromagnetic forces directed to prevent said movement of said unit away from said cavity.

4. The apparatus of claim 1 wherein said brushes are inner brushes, and wherein said unit further comprises additional outer brushes connected to said ferromagnetic member and positioned to be selectively biased against said rotor outside of said yoke cavity when said ferromagnetic member is received by said mating opening.

5. The apparatus of claim 4 wherein said ferromagnetic member is arcuate and coaxial with said rotor and forms a portion of the boundary of said cavity when received by said mating opening; said conductive member carrying said inner brushes is a first arcuate plate extending parallel to said rotor up to said ferromagnetic member at a point where said ferromagnetic member forms a portion of the boundary of said cavity, then extending along the surface of said ferromagnetic member toward said rotor, then away from said cavity along the surface of said ferromagnetic member closest to said rotor, and then away from said rotor along the surface of said ferromagnetic member farthest from said cavity to a point farther from said rotor than the farthest extent of said ferromagnetic member, said first plate being positioned to contact a first bus bar extending along the outer surface of said yoke when said unit is moved into said yoke cavity; and said outer brushes being carried by a second arcuate plate extending parallel to said rotor up to said first plate at a point where said first plate extends along the surface of said ferromagnetic member farthest from said cavity, and then extending along said first plate away from said rotor to a point farther from said rotor than the farthest extent of said first plate, said first plate being insulated from said second plate, said second plate being positioned to contact a second bus bar extending along the outer surface of said first bus bar when said unit is moved into said yoke cavity, said first bus bar being insulated from said second bus bar.

6. In a homopolar generator including a ferromagnetic yoke defining a cavity having a field coil therein encircling a rotor, and a plurality of brushes selectively biased against said rotor, the improvement comprising:
   a track means extending from the exterior of said yoke cavity into said yoke cavity;
   a bus bar attached to said yoke adjacent to said yoke cavity; and
   a removable brush unit including a conductive member carrying said brushes and a ferromagnet member carrying said conductive member and said brushes, said brush unit being slidably mounted on said track means for selective movement into and out of said yoke cavity, and said conductive member being positioned to contact said bus bar when said brush unit is moved into said yoke cavity.

* * * * *